Patented Mar. 16, 1943

2,313,728

UNITED STATES PATENT OFFICE 2,313,728

TANNING

Paul R. Austin and William E. Lundquist, Wilmington, Del., assignors to E. I. du Pont de Nemours & Company, Wilmington, Del., a corporation of Delaware No Drawing. Application October 6, 1941,
Serial No. 413,834

22 Claims. (Cl. 149—5)

This invention relates to compositions and processes for the production of leather and to the leather produced. It is more particularly directed to the treating of skins by subjecting them to a polymeric product of reaction of materials comprising maleic anhydride and an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

There have recently been developed tanning processes which involve the use of an acidic polymeric material in which the acidity is due to carboxyl groups attached to aliphatic carbon atoms. These processes are described in the George D. Graves Patents 2,205,882 and 2,205,883. These tanning agents are sometimes used with foam depressants as described in the Joseph S. Kirk Patent 2,220,867 and skins tanned with these agents are desirably affected by treatment with a metal salt as described in the Joseph S. Kirk Patent 2,205,901.

It is an object of this invention to produce tanning compositions and processes which are economical and which lead to leather of improved character. It is a further object to provide tanning compositions and processes by means of which there may be produced leather of good fullness, mellowness and smooth grain characteristics. It is a still further object to produce improved tanning compositions and processes of the character described in the George D. Graves patents above mentioned and further described in the said Joseph S. Kirk patents. It is a still further object to provide tanning compositions which may advantageously be used in conjunction with the agents of the said patents to George D. Graves and Joseph S. Kirk. It is a still further object of this invention to produce leather and particularly white leather of improved character and color. Further objects will become apparent hereinafter.

The foregoing and other objects of this invention are attained by the use of a product of reaction of materials comprising maleic anhydride and an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring. Preferably there may be used a product of reaction of materials comprising maleic anhydride and a cyclic terpene. These products may desirably be used alone or in conjunction with the tanning agents specifically described in the said Graves and Kirk patents. Or better yet, there may be employed a polymerization product of maleic anhydride with both a material with which it will polymerize as in the Graves Patent 2,205,882 and with a cyclic terpene.

The cyclic terpenes which are of the most interest for tanning compositions of the present invention are those commercially available from the naval stores industry, for instance, dipentene, alpha-pinene, beta-pinene, camphene, alpha-terpinene, phelandrene, and terpinolene. Dipentene, alpha-pinene, and alpha-terpinene are of particular interest because they are plentiful and readily available. The terpenes have the molecular formula $C_{10}H_{16}$ and contain one or two double bonds per molecule. The terpenes may be used in the pure state but as a practical matter it will usually be found expedient to use commercial mixtures obtained by fractionation of wood turpentine. Cheap terpene by-products consisting of a wide range of $C_{10}H_{16}$ terpenes, as for example the mixture of terpenes formed as a by-product from the rearrangement of alpha-pinene to camphene, are also suitable. For our present purposes we have found that excellent results are obtained using a commercial fraction which is composed largely of and is called dipentene.

While it is preferred, as above indicated, to use a terpene there may be used any unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring. Other such compounds, for instance, are vinyl cyclohexene, vinyl cyclohexane, and methylene cyclohexane.

Terpene reaction products with maleic anhydride may be prepared according to procedures such as those described in Peterson et al. 1,993,025; Peterson 1,993,031; Humphrey 1,993,034; and Humphrey 2,118,925.

While terpene-maleic anhydride reaction products such as those of the Peterson and Humphrey patents may advantageously be used for treating skins it will be found that the customary reaction product contains only a relatively small amount of high molecular weight polymerized product and it is this portion which has the most beneficial effect. One may recover and employ the high molecular weight portions of the reaction product, say by extraction of the less desirable portion with ether.

Dipentene-maleic anhydride reaction products or the high molecular weight polymeric fraction of said reaction products may advantageously be used as assistants to tanning agents of the Graves and Kirk patents before mentioned and they may be used either simultaneously or one before the other in either order. It may be found desirable, for instance, to make a mixture of dipentene-maleic anhydride reaction product with a tanning composition of any of the examples of Graves 2,205,882, say with styrene-maleic anhydride interpolymer of Example 5.

When a terpene-maleic anhydride reaction product is to be used with a product of the said Graves or Kirk patents which itself includes maleic anhydride there is great advantage in polymerizing both products simultaneously. When a terpene is polymerized with maleic anhydride in the presence of another polymerizable material which exothermically polymerizes with the maleic anhydride and which contains a vinyl, vinylene or vinylidene group the yield of high molecular weight or polymeric terpene-polymer is much greater. The resulting product is far more efficient as a tanning agent than a mere mixture of the individual reaction products and the leather producible is of superior quality. It will be understood that polymeric tanning agents according to the present invention may be prepared by including a terpene in the polymerization of maleic anhydride with any polymerizable material as suggested in the aforesaid Graves and Kirk patents. Additional maleic anhydride equivalent to the terpene should be used but aside from this the reaction can be carried out very much as in the aforesaid Graves and Kirk patents.

While any polymerizable material, as set out in the aforesaid Graves and Kirk patents, may be used with maleic anhydride and a terpene as above indicated it will generally be found desirable to use an olefin containing a terminal methylene group and more specifically a polymerizable vinyl, vinylene, or vinylidene compound. Still more specifically, these compounds are polymerizable mono-olefinic organic compounds containing a

group in which the non-hydrogen bearing carbon is attached to an organic radical containing a carbon atom joined to another atom by a plural bond, the carbon atom being removed from the

group by not more than one atom, and in which the remaining valences of the

radical are satisfied by hydrogen or hydrocarbon radicals. By formula these compounds may be defined as polymerizable mono-olefinic organic compounds having the formula

wherein Z is hydrogen or a hydrocarbon radical, X is hydrogen or a hydrocarbon radical, and Y is an organic radical containing a carbon atom joined to another atom by a plural bond, said carbon atom being removed from the ZCH=C radical by not more than one atom. Z and Y may be connected. In the preferred compounds Y is an aromatic hydrocarbon radical, for example as in styrene and indene. Typical of these compounds are vinyl esters, ethers, ketones, e. g. vinyl acetate, vinyl phenyl ethers, methyl vinyl ketone, aryl vinyl compounds wherein the vinyl group is attached directly to nuclear carbons, e. g., styrene; aryl vinylene compounds wherein the vinyl group is attached directly to the nuclear carbon, e. g., indene; alpha-methylene aliphatic monocarboxylic acids, their esters, amides and nitriles, for example, acrylic acid, methacrylic acid, methyl acrylate, methyl methacrylate, methacrylamide, methacrylonitrile, acrylonitrile, and the like. Of these the preferred compounds are styrene and indene and their alkyl substitution products.

The polymerization of tanning agents of the present invention may be carried out as in the aforementioned Graves and Kirk patents using any of various well-known procedures such as those effected at elevated temperatures with benzoyl peroxide as a catalyst and in the presence of solvent or dispersion media such as acetone, toluene, or those carried out by heating in the absence of a solvent and in the presence or absence of a catalyst or by exposure to ultraviolet light.

While excellent yields are obtained with so-called "bulk" polymerization, products of more desirable character may ordinarily be prepared by dissolving the reactants in a suitable solvent. Materials suitable for use as solvents should preferably boil at, say 70° C. or above, be inert to maleic anhydride and the other materials to be polymerized, and be readily separated from the product. Among such solvents may be mentioned benzene, toluene, xylene, higher alkylated benzenes, dioxan, acetone, and methyl ethyl ketone. Commercial styrene is frequently supplied to the trade in 50 to 60 per cent of xylene and when using such styrene it will ordinarily be desirable to use the xylene already present as the solvent. It will ordinarily be found desirable not to use a great excess of solvent over that required and the use of a higher proportion of solvents than about 50 per cent based on the total weight of the reaction mixture is usually not advantageous for economic reasons.

While as above indicated, polymerization may be effected in numerous ways and may use a catalyst, for instance such as ultraviolet light, it is ordinarily preferred to use a peroxide. Peroxides which may serve as catalysts are organic-soluble peroxides which include benzoyl peroxide, acetyl peroxide, butyryl peroxide, lauroyl peroxide, succinoyl peroxide, and ascaridole. Benzoyl peroxide, the preferred catalyst, is generally used in amount ranging from 0.1 to 5 per cent.

The copolymerization is generally carried out at temperatures of from about 80° C. to the boiling point of the reaction mixture which is usually below 175° C. Temperatures below 80° C. may be employed but the rate of reaction generally becomes very slow as the temperature is decreased. When the reaction is carried out at 100° C. or above it is usually complete in one hour or less.

In preparing polymerization products using maleic anhydride with both a cyclic terpene and another material polymerizable with the maleic anhydride the molecular proportion of reactants is frequently chosen so that the moles of maleic anhydride equal the sum of the moles of terpene plus the moles of the second polymerizable material. An excess of terpene may sometimes be used to advantage. The molar ratio of maleic anhydride:terpene:polymerizable vinyl, vinylene or vinylidene compound may vary from say 16:15:1 to 2:1:1. Preferred tanning agents will have a ratio say from 4:3:1 to 2:1:1. The ratio of reactants to be employed varies with the type of product desired; for example, maleic anhydride - dipentene - styrene copolymers prepared from a 2:1:1 reaction mixture are of higher average molecular weight than copolymers prepared from a 4:3:1 reaction mixture. Inasmuch as the commercial terpenes are generally cheaper than the second material polymerizable with maleic anhydride it is ordinarily desirable to use as high a proportion of terpene in the reaction mixture as possible and still obtain a tanning agent of required character. According to a preferred practice of the invention polymers of good character may be obtained using from 20 to 60 per cent of a cyclic terpene, 35 to 60 per cent of maleic anhydride, and 5 to 30 per cent of vinyl, vinylene, or vinylidene compound, the total components equaling 100 per cent by weight ratio.

After polymerization has been completed the reaction mixture may be extracted with ether or benzene to isolate the polymeric product. The polymeric product may also be recovered by digesting the reaction mixture with aqueous caustic whereupon all acidic products will pass into solution in the aqueous layer and may be separated from the oily layer consisting of solvent, small amounts of unreacted starting material, and so forth.

Polymeric tanning agents for use according to the present invention should be soluble in alkaline solutions at the pH at which tanning is to be started. It is also to be observed that while best results are obtained with polymeric materials the molecular weight should not be too high for reasons pointed out in the aforesaid Graves and Kirk patents.

The processes of this invention may be used for the treatment of any type of skin adapted to be converted into leather or fur. It is to be observed that the term "skin" is used generically to include heavy skins such as cowhide, lighter skins such as goatskin and calfskin, and also skins of fur-bearing animals. It will naturally be necessary to adapt the processes to the type of skin to be treated. For instance, goatskin may be more rapidly tanned than calfskin, but those skilled in the art are well aware of such factors and may readily adapt the agents of this invention to the specific needs of particular specialized problems.

Skins to be tanned according to the processes of this invention may be prepared in any of the manners customary in the art. They may suitably be unhaired, limed, delimed and bated, and pickled. The skins may if desired be depickled. They may also be given a salt liquor treatment to soften them up and to render them of more uniform condition as is the practice in prior art tanning processes.

While skins prepared in any manner may be treated according to the processes of this invention, the pH of the skins is important. As will be observed below, the tanning is effected at certain conditions of acidity and the skins may tend to change these conditions. The tanning solution may suitably be controlled to compensate for any variance of the pH of the skins from that of the tanning solution. It may sometimes be found advantageous to adapt the processes for preparing the skins so that a skin prepared for tanning is approximately at the pH of the tanning solution.

Too rapid reaction of the tanning agent with the skin in the first stages of the process should be avoided in order to prevent surface hardening of the skin. In tanning with acidic polymeric tanning agents this result is accomplished by careful adjustment of the pH of the tanning solution. The exact acidity of a tanning solution containing a polymer according to this invention may be widely varied depending upon the specific type of skin to be treated and depending upon the specific type of leather to be produced. While a wider range of acidity may be used, it will generally be found desirable to have the tanning solution initially at a pH from about 4.7 to 5.0. Still more specifically, it will be found that under many conditions of operation a pH of about 4.75 is optimum. At a pH much below 4.7 the affinity of skins for the polymerization products becomes so great that surface hardening takes place, while at a pH much above 4.7 the affinity of the hides for the tanning agent is so decreased that penetration is not sufficiently rapid for the best results.

The acidity of the polymerization products may suitably be adjusted by the use of such alkalies as alkali metal hydroxides or carbonates, ammonium hydroxide, and organic bases such as ethanolamines. As has been observed before, the pH of the hide should be considered in adjusting the pH of the tanning solution so that the tanning solution will be employed at an acidity within a desired range. To assist in maintaining the tanning solution at about the optimum acidity a suitable buffer salt such as sodium acetate or sodium phosphate may be included in the tanning solution.

After satisfactory penetration of skins by the tanning agent has been effected the rate of tanning may be accelerated by lowering the pH of the solution. The pH to which the solution should be brought to effect complete tanning will vary considerably with the specific type of skin being treated. It will not generally be desirable to go to a pH below about pH 3 since, at a higher hydrogen ion concentration, hydrolysis of the skin may take place. As a practical matter it will be found that the pH should be lowered to about 3.4 to 4.2, while more specifically it will be found that in many processes a pH of about 4 will be most satisfactory.

The lowering of the pH of the tanning solution may suitably be effected by the use of any acidic material such as lactic, hydrochloric, sulfuric, acetic, phosphoric, sulfamic, and formic acids.

The considerations as to the type of apparatus to use, the time to be allowed for tanning, the temperatures of tanning, and the amounts of tanning agent are substantially those known to the art in connection with prior art tanning processes. The time allowed for tanning must be sufficient to permit complete penetration of the tanning agent and the pH should not be lowered too rapidly or there may be puckering and apparent over-tannage of the grain surface. The tanning can best be effected at room temperature, say 20° to 30° C., but temperatures somewhat higher than those used by the art can successfully be employed if desired. The exact amount of the tanning agent to use can best be determined by a few simple tests under the specific conditions of the process selected and with the specific skin to be treated. In general, enough of the tanning agent must be used to effect the tanning desired but unduly large amounts should not be used as they will not be taken up by the leather in a reasonable period of time.

After a skin has been tanned with a polymeric material it is then preferably treated with a salt of a metal selected from the group consisting of aluminum, iron, titanium, copper, zirconium, and chromium. The treatment is effected by subjecting the leather to the action of a solution of the metal salt, the treatment being continued long enough to assure penetration of the hide by the metal salt solution.

While any soluble salt such as the sulfate, chloride, lactate, or acetate of aluminum, iron, titanium, copper, zirconium, or chromium may be used, it is preferred to use salts of inorganic acids, particularly those which are neither strongly oxidizing nor reducing. More specifically, it is preferred to use a salt of an acid selected from the group consisting of nitric acid, sulfuric acid, hydrochloric acid, and sulfamic acid, and by far the best results have been obtained with the sulfates.

The polymers employed for tanning skins according to the present invention apparently form some kind of chemical complex with skins and it is believed that the leather produced according to methods of this invention comprises a reaction product of skin substance with a polymeric product of reaction of materials comprising a cyclic terpene and maleic anhydride.

It will be understood that polymers of the present invention may if desired be used together with other tanning agents or tanning assistants in manners known to the art. They may, for instance, be used in conjunction with vegetable tanning materials such as quebracho extract, with chrome tans, or with synthetic tanning agents containing sulfonic acid groups. The tanning assistants used in conjunction with the acidic polymers may be used simultaneously or may precede or follow the treatment with the polymer. After skins have been tanned according to processes as above outlined it will often be found desirable also to treat with an aldehyde such as formaldehyde using for this purpose 2 to 5 per cent commercial formalin (40 per cent HCHO) on the original dry pickled weight of the skins.

Tanning compositions according to the present invention may advantageously contain a foam depressing material such as octanol as described particularly in the aforesaid Joseph S. Kirk Patent 2,220,867.

It will often be found desirable to effect tanning and subsequent treatment with metal salts, if used, in the presence of surface-active agents of the type often used as fat-liquoring assistants. Particularly excellent results have been obtained using chlorosulfonated straight chain hydrocarbons, the treatment tending to improve the quality of the leather and having no deleterious action on the resistance of the leather to ultraviolet light.

The treatment with a metal salt, if used, may frequently be modified to advantage by the joint use of a soluble lactate, acetate, citrate, or tartrate or by using lactic, acetic, tartaric or citric acids themselves.

The leather obtained according to the preferred processes of this invention is white but it may if desired be treated with white pigment or may be colored during or after the tanning process by the inclusion of any of the common leather dyes and pigments. The dying may be effected during the treatment with a metal salt.

Leather produced according to the processes of this invention may be subjected to any of the various kinds of finishing treatments customarily used. The leather, if desired, may be suitably filled or given any of the numerous surface treatments customary in the art.

In order that the invention may be better understood reference should be had to the following illustrative examples:

EXAMPLE I

*Preparation of tanning agent*

Sixty-eight parts by weight of commercial dipentene, 98 parts of maleic anhydride, and 46.5 parts of 56 per cent styrene were mixed and heated to 100° C. Polymerization was induced by the addition of one part of benzoyl peroxide and the temperature of the reaction mixture rose to 155° C. When it had cooled to 140° C. 3.5 parts of catalyst dissolved in 46.5 parts of 56 per cent styrene was added slowly to the well-stirred reaction mixture at such a rate as to maintain the reaction temperature between 140 and 155°. After the reaction had subsided the crude product was treated with 40 parts of sodium hydroxide in about a thousand parts of water. The mixture was warmed until solution of the polymer was complete. The organic layer consisting of xylene and unreacted dipentene was separated from the aqueous solution of hydrolyzed polymer. The final aqueous solution was at a pH of 5.2 and contained about 14 per cent of polymer as the anhydride or 17 per cent of polymer expressed as the partial sodium salt of the hydrolyzed polymer.

*Tanning process*

Preparatory to tanning 170 parts by weight of drained pickled calfskin, which had been previously limed and bated in customary manner, were placed in a tanning receptacle to which there was added a solution made up with 12.7 parts by weight of sodium chloride which corresponds to 7.5 per cent of the drained pickled weight of calfskin, 8.5 parts by weight of sodium acetate which is 5 per cent based on the drained pickled weight, and 212 parts by weight of water which is 125 per cent of the drained pickled weight of skins. The skins were agitated in this solution for five minutes in order to depickle partially and to prepare them for tannage.

A tanning solution was prepared by adding 0.5 part by weight of octanol to 73 parts by weight of a solution of polymer at pH 5.2 prepared as above outlined.

The tanning solution was added to the receptacle which contained skins and depickling liquor in three approximately equal portions at fifteen-minute intervals. The skins were agitated between additions and after the last addition were agitated for one hour. The pH of the solution at the end of this time was 4.78.

The pH of the tanning solution was then lowered to 3.5 by the addition of dilute sulfuric acid (10 per cent $H_2SO_4$). Ten parts by weight of the dilute acid was added and this addition was repeated each half hour until four additions had been made and the desired pH had been reached. The total time required for the addition was two hours and after this the agitation was continued for twenty minutes. The skins were now tanned and had a soft, full, well-tanned feel.

To the skins in the now exhausted tanning liquor was added 102 parts by weight of a 10 per cent water solution of aluminum sulfate $(Al_2(SO_4)_3 \cdot 18H_2O)$ which was prepared by dissolving 100 parts by weight of aluminum sulfate in 1000 parts by weight of water. The agitation was continued for fifteen minutes without interruption. To the solution containing the tanned skins and alum solution was then added 3.4 parts by weight of sodium acetate and the agitation continued for fifteen minutes.

The solution was then neutralized to pH 5.03 by the addition of a 10 per cent solution of sodium bicarbonate during the course of one hour and fifty-five minutes of agitation. The bicarbonate solution was added in four approximately equal portions with twenty-minute intervals of agitation between additions. About twelve parts by weight of sodium bicarbonate were used.

The tanned leather was piled down over night, shaved, washed thoroughly to remove salts, and fatliquored. The leather was hung to dry, sammied, staked and tacked out flat. The leather was found to be extremely full, white, and mellow and had outstanding quality.

Example II

Preparation of tanning agent

One hundred two parts of commercial dipentene and 98 parts of maleic anhydride were heated to 120° C. A solution of 3 parts of benzoyl peroxide in 46.5 parts of 56 per cent styrene was added slowly to the reaction mixture at such a rate as to maintain the reaction temperature at 120–150°. When all the styrene had been added, an additional 1.5 parts of benzoyl peroxide was added to the reaction mixture. The yield of an aliquot part of the product, worked up by extracting all the unreacted monomer and low molecular weight polymer from the higher molecular weight polymeric material with ether, amounted to 71 per cent of the total weight of reactants. The remainder of the product was hydrolyzed with alkali and water and the organic layer consisting of xylene and unreacted dipentene was removed. The solution obtained was at a pH of 5.2 and contained 11.8 per cent of polymer expressed as the anhydride, or, equivalently, 14.6 per cent of polymer expressed as the partial sodium salt of hydrolyzed polymer.

Tanning process

For tanning there was taken 182 parts by weight of drained, pickled calfskin which had been previously limed, unhaired, and bated. The calfskin was placed in a tanning receptacle containing a solution made up with sodium chloride 13.6 parts by weight which is 7.5 per cent of the drained pickled weight of skin, sodium acetate 9.1 parts by weight which is 5 per cent based on the drained pickled weight of skin, and water 227 parts by weight which is 125 per cent of the drained pickled weight of skin. The skins were agitated in this solution for five minutes in order to effect a partial depickling of the skins.

A tanning solution was prepared taking 93 parts by weight of the solution of partially neutralized polymer prepared as above, diluting with 16 parts by weight of water, and adding thereto .5 part by weight of octanol. This solution was added to the tanning receptacle in three substantially equal portions and the receptacle is agitated for fifteen minutes between each addition. Agitation was then continued for one hour without interruption and a pH was finally reached of 4.75.

The pH of the tanning solution was adjusted to 3.41 by the addition of a dilute sulfuric acid solution as in Example I. At the end of this treatment the skins had assumed a full tanned feel.

To the tanning receptacle containing the tanned skins and exhausted tanning liquor was then added 109 parts by weight of a 10 per cent aluminum sulfate solution prepared as in Example I. The receptacle and contents were agitated for fifteen minutes and then 3.6 parts by weight of sodium acetate was added. Agitation was continued for fifteen minutes. The solution was then neutralized to pH 5.05 by successive additions of a 10 per cent solution of sodium bicarbonate. The additions were made at twenty-minute intervals using five additions of about 25 parts by weight of solution each. The total quantity of bicarbonate used was about 12.5 parts by weight and the total time for neutralization was one hour and fifty-five minutes.

The skins were then piled down over night and on the following day washed, shaved, and fatliquored. They were then dried, sammied, staked and tacked. The resultant leather was white, full, mellow, and of extremely desirable quality.

Example III

Preparation of tanning agent

A terpene-maleic anhydride polymer prepared with maleic anhydride and alpha-terpinene as in Peterson and Littmann Patent 1,993,025 was extracted with a large volume of ether. About 3 per cent of the total weight was isolated as a solid product. This solid product was dissolved in dilute alkali to produce a 10 per cent solution (based on anhydride) as pH 5.2. Forty parts by weight of this solution was used with 120 parts by weight of a 10 per cent solution of a styrene-maleic anhydride polymer of pH 5.2 prepared as in Example II of the aforementioned Kirk Patent 2,205,901.

Tanning process

Two hundred parts by weight of drained pickled calfskin which had been previously limed and bated were placed in a tanning receptacle which contained a solution of sodium chloride and sodium acetate in water. This solution contained 15 parts by weight of sodium chloride which corresponds to 7.5 per cent of the drained pickled weight of skins. Ten grams of sodium acetate which corresponds to 5 per cent of the drained pickled weight and 250 parts by weight of water which corresponds to 125 per cent of the drained pickled weight of skins. The tanning receptacle was agitated for five minutes in order to effect partial depickling of the skins.

The tanning solution prepared above was added to the receptacle in three substantially equal portions with fifteen-minute intervals between additions. A pH of 4.72 was reached.

The pH of the solution was then lowered to 3.50 by the addition of 10 per cent sulfuric acid solution. The acid was added in four portions of 10 parts by weight each with a final addition of 6 parts by weight. A total of about 46 parts by weight of dilute acid was used and the acidification required two hours and twenty-five minutes.

The skins now had a plump, tanned appearance.

To the receptacle containing the skins and exhausted tanning liquor was added 160 parts by weight of a 10 per cent aluminum sulfate solution and the receptacle was agitated for fifteen minutes. Four parts by weight of sodium acetate was then added and the receptacle was agitated for another fifteen minutes. The solution was then neutralized to pH 5.0 by seven successive additions of 10 per cent sodium bicarbonate at intervals of about twenty minutes during which time the skins were agitated continuously. There was used a total of about 145 parts by weight of 10 per cent solution and the addition required about two hours and twenty minutes.

The skins were piled down overnight and on the following day washed, shaved, and fatliquored. The leather was dried, sammied, staked, and tacked. The leather produced was full, white, and supple.

Example IV

*Preparation of tanning agent*

One hundred ninety-six parts of maleic anhydride, 204 parts of alpha-pinene, 52 parts of styrene, and 41 parts of xylene are heated to 125° in an open reaction vessel with stirring. After a small initial exothermic reaction has subsided, 8 parts of benzoyl peroxide is added slowly to the reaction mixture with constant stirring at such a rate as to maintain the reaction temperature between 125 and 150° C. The yield of benzene-insoluble polymeric product amounts to 213 parts or 47 per cent of the total weight of reactants. A portion of this was hydrolyzed with aqueous alkali to obtain a clear solution having a pH of 5.2 and containing 10 per cent of the polymer based on the unhydrolyzed anhydride.

*Tanning process*

One hundred fifteen parts by weight of drained pickled calfskin were placed in a tanning receptacle with a solution of sodium chloride and sodium acetate in water as in Example I using the same proportion of solution based on the drained pickled weight. After five minutes of agitation there was added to the receptacle in three equal portions and at fifteen-minute intervals a tanning solution containing 92 parts by weight of the 10 per cent aqueous solution of polymer prepared as above.

The skins were drummed for one and one-half hours and were then acidified to pH 3.5 by the addition of 10 per cent sulfuric acid. The additions were made at twenty-minute intervals using five parts by weight of acid at each addition. The total acid used amounted to 30 parts by weight of 10 per cent $H_2SO_4$ solution and the acidification required two hours and ten minutes.

The skins were soft, mellow, and appeared well tanned.

To the tanning receptacle containing the tanned skins and exhausted tanning liquors was added 92 parts by weight of a 10 per cent solution of aluminum sulfate and the receptacle was agitated for one-half hour.

To the receptacle was added 2.3 parts by weight of sodium acetate and 20 parts by weight of a 10 per cent solution of sodium bicarbonate. Neutralization was continued by successive additions of sodium bicarbonate solution at twenty-minute intervals until a total of five additions had been made. The total time was two hours and ten minutes and the final pH reached was 5.1.

The resultant leather was washed and fatliquored as in Example I to produce a leather which was soft, full, and white.

Example V

*Preparation of tanning agent*

Forty and five-tenths grams of vinyl cyclohexene, 49 parts of maleic anhydride, and 23.2 parts of 56 per cent styrene were dissolved in 450 parts of xylene. The solution was warmed and 2 parts of benzoyl peroxide was added. The mixture was heated until polymerization began at 85-90° C. The temperature remained at 100-110° for an hour during the polymerization. The product was isolated by filtration and amounted to 60 parts. A portion of it was hydrolyzed with aqueous alkali to obtain a solution having a pH of 5.2 and a concentration of 10 per cent based on the unhydrolyzed polymer.

*Tanning process*

As in Example I, 180 parts by weight of drained, pickled calfskin were treated with a solution of sodium chloride and sodium acetate. To 108 parts by weight of a tanning agent prepared as above there was added 0.5 part by weight of octanol and the mixture was added to the tanning receptacle in three equal parts at intervals of fifteen minutes. After addition agitation of the skins was continued for an hour, reaching a pH finally of 4.83.

The pH of the tanning solution was lowered to 3.55 by adding 10 per cent sulfuric acid in four portions each amounting to about ten parts by weight and each addition being made after about thirty minutes' agitation. The total time of acidification was one hour and fifty minutes and the final pH was 3.55. The leather produced had a full tanned feel and appearance.

The leather produced as above was left in the exhausted tanning liquor and there was added 108 parts by weight of a 10 per cent solution of aluminum sulfate $(Al_2(SO_4)_3.18H_2O)$. The solution was agitated for fifteen minutes after which 3.6 parts by weight (which is 2 per cent of the drained pickled weight of the skins) of sodium acetate was added and agitation was continued for another fifteen minutes. The solution was then neutralized to pH 5.03 with sodium bicarbonate. The additions were made at intervals over a total time of two hours and five minutes.

The skins were piled down over night after which they were washed, shaved, and fatliquored. The skins were then dried, sammied, staked and tacked out flat. The resulting product was a white leather which was well-tanned and exhibited good leather characteristics.

Example VI

*Preparation of tanning agent*

Forty-nine parts of maleic anhydride and 48 parts of methylene cyclohexane were dissolved in 250 parts of dioxan and 1 part of benzoyl peroxide catalyst was added. The solution was heated on a steam bath for one hour during which time it gradually became more viscous. After cooling the polymeric product was isolated by running the dioxan solution slowly into a well-stirred 50:50 mixture of water and methanol. A portion of the polymeric material thus obtained was hydrolyzed by digestion with dilute alkali to obtain a solution having a pH of 5.2 and a concentration of 10 per cent based on the unhydrolyzed polymer.

*Tanning process*

Ninety-five parts by weight of a tanning solution prepared as above and containing 0.5 part by weight of octanol were used for tanning 158 parts by weight of calfskin using a process as described in the foregoing example. The leather produced was extremely full, white, soft, and supple.

EXAMPLE VII

*Preparation of tanning agent*

Thirty-four parts of beta-pinene and 24½ parts of maleic anhydride were heated to 95° C. in a reaction vessel provided with a stirrer and a reflux condenser and 1 part of benzoyl peroxide was added slowly with stirring. The heat of the reaction caused the temperature to rise gradually to 160° C. When the reaction temperature began to subside an additional ½ part of benzoyl peroxide was added. After cooling, the reaction mixture was extracted with ether to remove unreacted monomer and low molecular weight polymeric products. The yield of ether insoluble product was 34 parts or 58 per cent of the weight of the reactants. This material was dissolved in aqueous alkali to obtain a solution for use in tanning.

*Tanning process*

Tanning was effected as in the previous examples with 129 parts by weight (drained pickled weight) of calfskin which after depickling was added to 77.4 parts by weight of a 10 per cent solution of the product prepared as above.

EXAMPLE VIII

*Preparation of tanning agent*

Sixty-eight parts of beta-pinene and 49 parts of maleic anhydride were dissolved in 175 parts of dioxane and the solution was heated to 85° C. in a reaction vessel provided with a stirrer and a reflux condenser. One and one-half part of benzoyl peroxide was added and the solution was heated for 2 hours. After the first addition of catalyst a turbidity developed and a syrupy polymer separated from the reaction mixture. After cooling, the reaction mixture was poured into a methanol-water mixture and the insoluble material which precipitated out was isolated by filtering and drying. The yield was 61 parts or 52 per cent of the weight of the reactants.

*Tanning process*

Tanning was effected substantially as in the preceding examples with the product thus prepared.

EXAMPLE IX

*Preparation of tanning agent*

Fifty-one parts of beta-pinene, 49 parts of maleic anhydride, 13 parts of styrene, and 10 parts of xylene are heated on a steam bath to 90° C. Two-tenths part of benzoyl peroxide is then added and the temperature very slowly and smoothly rises to around 160° C. After cooling, the product is extracted with ether to obtain 91 parts of ether-insoluble, polymeric product which is equivalent to 81 per cent of the weight of reactants.

*Tanning process*

The product of this example was used for tanning in the manner previously shown.

EXAMPLE X

*Preparation of tanning agent*

Thirty-six parts of methylene cyclohexane, 49 parts of maleic anhydride and 13 parts of toluene were dissolved in 100 parts of xylene and the solution was heated to 90° C. in a reaction vessel provided with a stirrer and a reflux condenser. One part of benzoyl peroxide was added. The heat of polymerization caused the temperature to rise to 135° C. After cooling, the xylene insoluble product was isolated and dried. The yield was 77 parts or 79 per cent of the weight of reactants.

*Tanning process*

The product was used as a tanning assistant in a manner similar to that of the preceding examples.

EXAMPLE XI

*Preparation of tanning agent*

Sixty-eight parts of dipentene and 98 parts of maleic anhydride are heated to 110° C. A solution of 4 parts of benzoyl peroxide in 43 parts of vinyl acetate is added slowly to the reaction mixture which is kept under reflux to avoid loss of the low-boiling vinyl acetate. Then an additional part of peroxide catalyst is added to the reaction mixture. The yield of ether-insoluble polymeric product amounts to 101 parts or 48 per cent of the weight of the reactants.

*Tanning process*

The tanning agent obtained was used in tanning processes such as those previously described.

EXAMPLE XII

*Preparation of tanning agent*

One hundred two parts of the commercial terpene fraction boiling at 175°–187° C. and 98 parts of maleic anhydride are heated to 130° C. A solution of 4 parts of benzoyl peroxide in 26 parts of styrene and 26 parts of xylene is then added slowly to the reaction mixture at such a rate as to maintain the reaction temperature at 130–140° C. At the end of the reaction an additional one-half part of benzoyl peroxide catalyst is added. After cooling the product is extracted with ether to obtain 147 parts of ether-insoluble polymeric product which is equivalent to a 65 per cent yield based on the total weight of reactants.

*Tanning process*

A tanning solution was made up using one per cent by weight of the product thus prepared together with 5 per cent of a styrene-maleic anhydride polymer prepared as in Example II of Kirk Patent 2,205,901. The tanning solution was used as previously described.

Tanning compositions of the present invention may most desirably be offered to the trade as partial sodium salts of a polymeric reaction product of materials comprising a cyclic terpene and maleic anhydride, and it will customarily be found desirable for these compositions to dissolve in water to give a tanning solution of pH from about 4.8 to 5.7. If desired, however, unneutralized polymer may be sold to the trade and it may be adjusted to a suitable pH prior to tanning. Tanning compositions of the invention may suitably include combinations of tanning agents and tanning assistants.

While we have shown certain specific illustrative processes and compositions it will be understood that without departing from the spirit of this invention one skilled in the art may readily devise numerous tanning solutions, compositions, and processes employing products of reaction of materials comprising a cyclic terpene and maleic anhydride.

We claim:

1. In a process for the treating of skins, the step comprising subjecting a skin to the action of a product of reaction of materials comprising maleic anhydride and an unsaturated aliphatic cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

2. In a process for the treating of skins, the step comprising subjecting a skin to the action of a polymeric product of reaction of materials comprising maleic anhydride and a cyclic terpene.

3. In a process for the treating of skins, the step comprising subjecting a skin to the action of a polymerization product of maleic anhydride with a cyclic terpene and with another material with which it will polymerize.

4. In a process for the tanning of skins, the step comprising subjecting a skin to the action of a polymerization product of maleic anhydride with a polymerizable vinyl, vinylene, or vinylidene compound and with an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

5. In a process for the tanning of skins, the step comprising subjecting a skin to the action of a polymerization product of maleic anhydride with a cyclic terpene and with a polymerizable vinyl, vinylene, or vinylidene compound.

6. In a process for the tanning of skins, the step comprising subjecting a skin to the action of a polymerization product of maleic anhydride with a cyclic terpene and styrene.

7. In a process for the tanning of skins, the step comprising subjecting a skin to the action of a polymerization product of maleic anhydride with dipentene and styrene.

8. A composition for treating skins comprising a product of reaction of materials comprising maleic anhydride and a cyclic terpene.

9. A composition for treating skins comprising a partially neutralized acidic polymerization product of reaction of materials comprising maleic anhydride and a cyclic terpene, the composition upon dissolving in water forming a solution with a pH of about 4.8 to 5.7.

10. A composition for treating skins comprising a polymeric product of reaction of materials comprising maleic anhydride and a cyclic terpene.

11. A tanning composition comprising a polymerization product of maleic anhydride with a cyclic terpene and with another material with which it will polymerize.

12. A tanning composition comprising a polymerization product of maleic anhydride with a polymerizable vinyl, vinylene, or vinylidene compound and with an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

13. A tanning composition comprising a polymerization product of maleic anhydride with a polymerizable vinyl, vinylene, or vinylidene compound and with a cyclic terpene.

14. A tanning composition comprising a polymerization product of maleic anhydride with a cyclic terpene and styrene.

15. A tanning composition comprising a polymerization product of maleic anhydride with dipentene and styrene.

16. Leather which comprises a reaction product of skin substance with a product of reaction of materials comprising maleic anhydride and an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

17. Leather which comprises a reaction product of skin substance with a polymeric product of reaction of materials comprising maleic anhydride and a cyclic terpene.

18. Leather which comprises a reaction product of skin substance with a polymerization product of maleic anhydride with a cyclic terpene and with another material with which it will polymerize.

19. Leather which comprises a reaction product of skin substance with a polymerization product of maleic anhydride with a polymerizable compound selected from the group consisting of vinyl, vinylene, and vinylidene compounds and with an unsaturated cycloaliphatic hydrocarbon having a six-membered cycloaliphatic ring with at least one open-chain substituent on the ring and containing at least one carbon-to-carbon double bond which may be either a part of the cycloaliphatic annular structure or in the open-chain substituent on the ring.

20. Leather which comprises a reaction product of skin substance with a polymerization product of maleic anhydride with a polymerizable compound selected from the group consisting of vinyl, vinylene, and vinylidene compounds and with a cyclic terpene.

21. Leather which comprises a reaction product of skin substance with a polymerization product of maleic anhydride with a cyclic terpene and styrene.

22. Leather which comprises a reaction product of skin substance with a polymerization product of maleic anhydride with dipentene and styrene.

PAUL R. AUSTIN.
WILLIAM E. LUNDQUIST.